L. GEER, DEC'D.
G. O. REDINGTON & D. Q. R. GEER, EXECUTORS.
PROCESS OF AND APPARATUS FOR PROOFING.
APPLICATION FILED APR. 26, 1910.
1,160,980.
Patented Nov. 16, 1915.
2 SHEETS—SHEET 1.
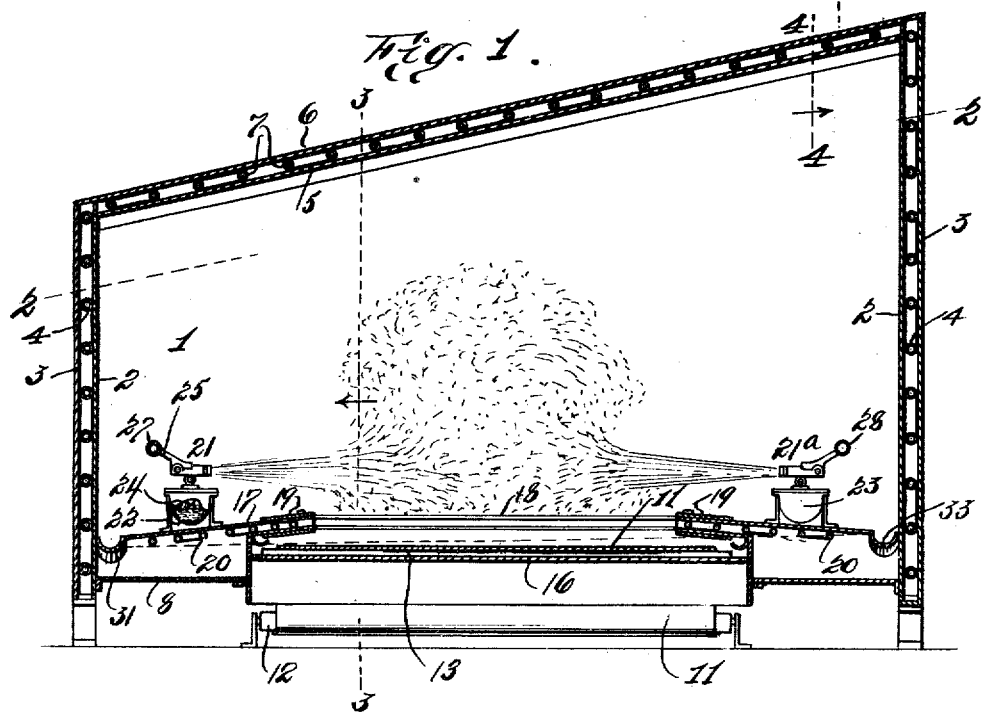
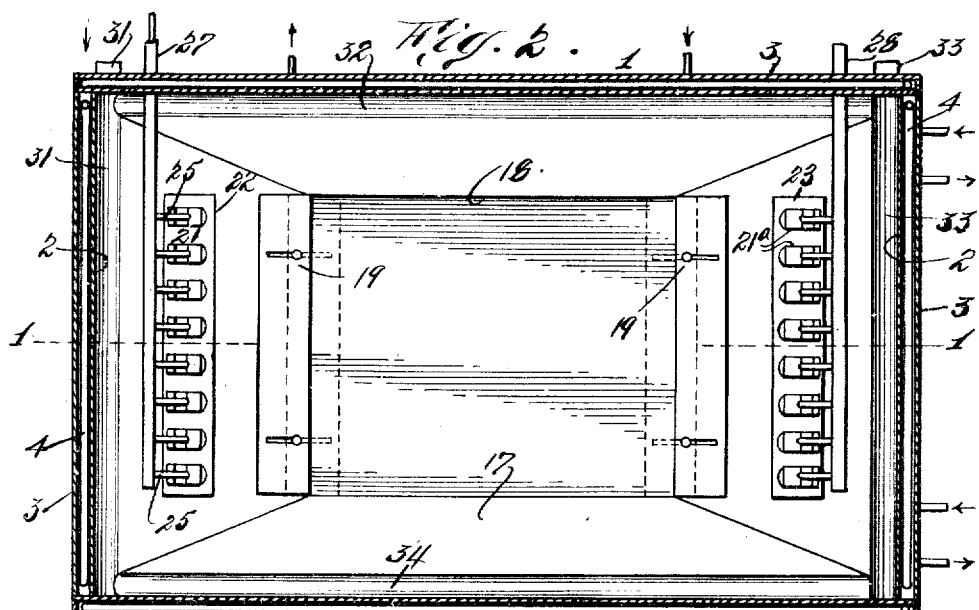
Witnesses:
C. A. Jarvis
Beatrice Mims
Inventor:
Langdon Geer.
by
Attorneys

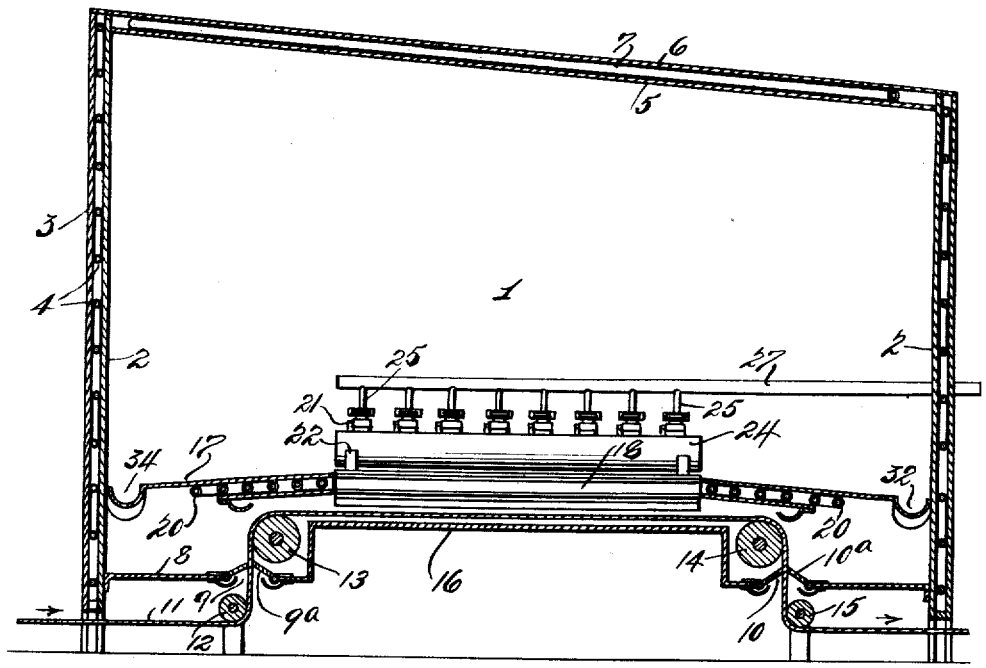

UNITED STATES PATENT OFFICE.

LANGDON GEER, OF NEW YORK, N. Y.; GEORGE O. REDINGTON AND DOROTHY Q. ROOSEVELT GEER, OF NEW YORK, N. Y., EXECUTORS OF SAID LANGDON GEER, DECEASED.

PROCESS OF AND APPARATUS FOR PROOFING.

1,160,980.

Specification of Letters Patent.

Patented Nov. 16, 1915.

Application filed April 26, 1910. Serial No. 557,720.

*To all whom it may concern:*

Be it known that I, LANGDON GEER, a citizen of the United States, residing at New York city, New York, have invented certain new and useful Improvements in Processes of and Apparatus for Proofing, of which the following is a clear, full, and exact description.

The present invention is a development of the invention described and claimed in my copending application Serial No. 262,308.

The object of this invention is to provide an improved process for proofing fabrics either in the piece, strip or otherwise, and also to provide certain improvements in apparatus for carrying out said process.

Concisely stated, the process may be said to consist in forcing or in projecting a proofing substance in atomized condition directly over the plane of the material to be proofed without directly striking the upper surface of said material, to form a nebulous cloud or mass thereover, and depositing said substance by gravity onto the upper surface of said material. The proofing substance or composition may be any suitable water-proofing substance which is susceptible to atomization.

In a co-pending application filed cotemporaneously herewith, a form of atomizer is described which is preferably used in carrying out the present improved process, although this invention is not necessarily restricted thereto, as any suitable means for atomizing the proofing substance may be resorted to.

My invention consists of certain novel steps in the process and in the apparatus for carrying out the same, which will be hereinafter described and then claimed with reference to the accompanying drawings, showing a suitable embodiment of the invention, and in which—

Figure 1 is a transverse sectional view of my preferred form of apparatus, on line 1—1, Fig. 2. Fig. 2 is a horizontal sectional view, on the line 2—2, Fig. 1. Fig. 3 is a transverse section, on the line 3—3, Fig. 1, on a larger scale, and Fig. 4 is a partial section, on line 4—4, Fig. 1.

The chamber 1 in which the herein described process is preferably carried out is composed of upright walls 2, and outer jacket walls 3 spaced a suitable distance from the walls 2 so as to provide spaces to contain heating means 4, preferably in the form of steam pipes, having a suitable steam inlet and an outlet for the exhaust steam. The roof of the chamber 1 is also provided with double walls, comprising an inner wall or roof 5, and an outer wall or roof 6, spaced from roof 5 so as to provide a space to contain heating coils 7 or the like.

The lower floor 8 of chamber 1 is shown more clearly in Fig. 3, where it will be seen that it has gate-controlled openings 9, 10 at opposite ends to permit the passage, through the floor, of a strip of fabric 11 to be proofed. The gates 9ª, 10ª are pivoted and are arranged in normal contact with opposite surfaces of the fabric strip 11, so as to exclude the cold outer air from the chamber 1 and yet permit the passage of the strip through the floor. A pair of guide rollers 12, 13 located at the forward end of the chamber 1, respectively below and above the floor, guide the incoming end of the strip, while a similar pair of rollers 14, 15, guide the outgoing end of said strip. That portion of the strip which is being proofed during any given period of time is elevated in a plane above the ends of the strip, by means of said rollers 13, 14. The said floor 8 is elevated to form a platform 16, between the two rollers 13, 14, for convenience sake. Above the floor 8 there is an inner floor 17 which is provided with a large central aperture 18, which is located above the elevated portion 16 of the lower floor 8, so that the upper surface of the fabric strip 11 is well exposed through said aperture. The said inner floor 17 is provided at opposite edges of the aperture 18 with adjustable plates 19, whereby the size of the aperture may be diminished or increased so as to expose a less or greater surface of the strip 11 through the aperture. In the space between the floors 8 and 17 suitable steam or other heating coils or pipes 20 are arranged. As is known, the said chamber 1 is kept highly heated by means in the nature of those described, in order that the atomized proofing substance or composition will not have a tendency to congeal in an objectionable manner.

In accordance with the present invention, this process is carried out in such a way that the atomized proofing substance is first formed in a nebulous cloud over the surface of the material to be proofed and is then deposited almost if not entirely by gravity upon the exposed upper surface of such material. To this end there is mounted at opposite sides of the aperture 18 a plurality of atomizers 21, 21ª, which are arranged so as to direct their sprays from opposite sides of the heated chamber 1, toward the center, and over the aperture 18. Said atomizers may be constructed in any suitable manner so as to project a proper spray and are preferably constructed in accordance with the disclosure of my application before referred to. The atomizers at opposite sides of said aperture 18 are mounted upon receptacles 22, 23, for the liquefied proofing substance, said substance being kept hot in any suitable manner. Each atomizer 21 or 21ª, has a supply tube 24, for liquefied proofing substance, to which end said tube dips into the proofing substance in the receptacle, and also a liquid or fluid pressure pipe 25 which supplies pressure fluid or liquid to the atomizer, so as to expel the proofing substance from the atomizer and to atomize the same. A fluid pressure supply pipe 27 supplies the plurality of atomizers at one side of chamber 1 with pressure fluid, while a similar pipe 28 supplies the atomizers at the other side of chamber 1.

It will be seen from the above description that the atomizer or atomizers at one side of the aperture 18 projects a spray in one direction toward the center of the heating chamber, while the atomizer or atomizers at the opposite side of said aperture projects a spray or sprays in opposite direction toward the center of the heating chamber. The sprays of atomized proofing substance are directed into a free and uninterrupted air space above the fabric or material to be proofed and in a plane over and substantially parallel with that of the surface of the fabric or material to be proofed, so that the sprays themselves do not strike the said material. The object of spraying in this manner is to produce a nebulous cloud or mass of atomized proofing substance over the surface of the material to be proofed, in such a manner that the atomized proofing substance will fall or gravitate onto the receptive surface of the material, whereby said surface is proofed. For maintaining a draft in the heated chamber 1 to assist in forming said nebulous cloud and to carry off the surplus atomized proofing substance, a fan or blower 29 shown in Fig. 3, exerts a suction action through an opening 30 located near the highest point of roof, at one side of said heated chamber.

The double roof 5, 6, is inclined upwardly in one direction from one side wall of the heated chamber 1 toward the opposite side wall thereof as shown in Fig. 1, while it is also inclined in another direction from one of the other two side walls of said heated chamber toward the other side wall thereof as shown in Fig. 3. Thereby a double inclination is given to the roof upwardly from one side wall and also upwardly from an adjacent side wall. The said draft opening 30 is located directly under the highest corner of the roof so that there is a tendency for the surplus atomized proofing substance to be sucked out through said opening at the highest point within the heated chamber. The proofing substance which accumulates on the under surface of roof 5 will flow downwardly toward the lowest level of said roof and thence downwardly along the adjacent wall 2 into a discharge gutter 31, which leads outside of said heated chamber. In addition to gutter 31 which is located at one end of the inner floor 17, there are gutters 32, 33 and 34 arranged around the other sides of said floor 17. The sides of the floor 17 beyond the aperture 18 incline from the central portion of the heated chamber downwardly to said gutters 31, 32, 33 and 34 so that any of the proofing substance which falls onto said floor will flow into said gutters and thence out of the heated chamber for the purpose of being saved for future use.

What I claim as new is:

1. The process of proofing with a proofing substance which is solid at ordinary temperature, which consists in projecting a plurality of sprays of heated atomized proofing substance, in direct opposition, that is toward each other, and over the material to be proofed, within a closed heated chamber, so that the substances from the different sprays mingle and depositing said atomized substance onto the upper surface of said material.

2. The process of proofing with a proofing substance which is solid at ordinary temperature, which consists in heating proofing substance, projecting a plurality of sprays of heated atomized proofing substance, in direct opposition, over the material to be proofed, the force of said projected substance being in a plane substantially parallel with that of said material, moving said material in a plane parallel with said plane of projection, and depositing said atomized substance onto the upper surface of said material.

3. An apparatus for proofing with a proofing substance, which comprises means for supporting material to be proofed with one surface uppermost, and means for projecting a plurality of sprays of atomized proofing substance, in direct opposition, so that the said sprays mingle over the material to be proofed so that said substance may be deposited thereon by gravity and in heated condition.

4. An apparatus for proofing with a proofing substance, which comprises a heated chamber, means for supporting material to be proofed with one surface uppermost, in said chamber, and means for projecting a plurality of sprays of atomized and heated proofing substance, in opposition, over and substantially parallel with the material to be proofed so that said substance may be deposited thereon by gravity and in heated condition.

5. An apparatus for proofing with a proofing substance, which comprises a chamber having a floor which is inclined on all sides in the direction of the corresponding side walls of said chamber, said floor having an opening in its highest part, and means for applying said proofing substances in an atomized condition to the material exposed through said opening.

6. An apparatus for proofing with a proofing substance, which comprises a chamber having a double floor, the inner floor having an opening, means for exposing the material to be proofed above the lower floor, through said opening in the inner floor, said inner floor being inclined on all sides in the direction of the corresponding side walls of said chamber, and means for applying said substance in an atomized condition to the material exposed through said opening in said floor.

7. An apparatus for proofing with a proofing substance which comprises a chamber having a double floor, means for conducting the material to be proofed between said floors and exposing the same through an opening in the inner floor of said double floor, and means located at opposite edges of said opening for projecting a plurality of sprays of atomized proofing substance, in opposition, over the material to be proofed so that said substance may be deposited thereon by gravity.

8. An apparatus for proofing with a proofing substances, which comprises means for supporting material to be proofed, with one surface uppermost, a floor having an aperture through which said surface is exposed, means for adjusting the size of said aperture, means for moving said material while in said position, means for heating said proofing substance, and means for projecting said proofing substance in atomized and heated condition over, and substantially parallel with, said surface of said material so that said substance may be deposited thereon by gravity and in heated condition as said material moves along.

9. An apparatus for proofing with a proofing substance, which comprises a heated chamber having a floor provided with an aperture, means for adjusting the size of said aperture, means for supporting material to be proofed with one surface uppermost and exposed through said aperture, means for moving said materal while in said position, and means for projecting proofing substance in atomized and heated condition into said chamber and over, and substantially parallel with, said material so that said substance may be deposited thereon by gravity and in heated condition as said material moves along.

Signed at New York city, N. Y. this 15th day of April 1910.

LANGDON GEER.

Witnesses:
BEATRICE MIRVIS,
CHESTER T. NEAL.

Correction in Letters Patent No. 1,160,980.

It is hereby certified that in Letters Patent No. 1,160,980, granted November 16, 1915, upon the application of Langdon Greer, of New York, N. Y., for an improvement in "Processes of and Apparatus for Proofing," an error appears in the printed specification requiring correction as follows: Page 3, lines 17 and 45, claims 5 and 8, for the word "substances" read *substance;* and that the said Letters Patent should be read with this correction therein that the same may conform to the record of the case in the Patent Office.

Signed and sealed this 7th day of December, A. D., 1915.

[SEAL.]

R. F. WHITEHEAD,
*Acting Commissioner of Patents.*

Cl. 91—45.